United States Patent [19]

Sabba

[11] 4,256,690
[45] Mar. 17, 1981

[54] VACUUM FORMING METHOD

[75] Inventor: Pierluigi Sabba, Massa Lombarda, Italy

[73] Assignee: NESPAK S.p.A. Societa Generale per l'Imballaggio, Massa Lombarda, Italy

[21] Appl. No.: 26,501

[22] Filed: Apr. 3, 1979

[30] Foreign Application Priority Data

Apr. 10, 1978 [IT] Italy ................................ 12557 A/78

[51] Int. Cl.³ ........................ B29C 17/04; B29C 17/14
[52] U.S. Cl. .................................... 264/504; 264/553; 425/290
[58] Field of Search ........ 264/553, 554, 504, 154–156; 425/290

[56] References Cited

U.S. PATENT DOCUMENTS 2,509,882  5/1950  Roberts .............................. 264/553 X
3,308,213  3/1967  Carrigan et al. ...................... 264/553

FOREIGN PATENT DOCUMENTS 2324027  6/1975  Fed. Rep. of Germany ........... 425/290

Primary Examiner—Jan H. Silbaugh
Attorney, Agent, or Firm—Edwin E. Greigg

[57] ABSTRACT

A forming die including a cup-shaped cavity for the vacuum thermoforming of sheets of thermoplastic material includes, in the center of its bottom, an upwardly directed pointed projection, the height of which is remarkably smaller than the depth of the said cavity. The suction bores through which vacuum is generated at the interior of the cavity are arranged at the periphery of the bottom of the cavity itself.

1 Claim, 5 Drawing Figures

VACUUM FORMING METHOD

STATEMENT OF PRIOR ART

In accordance with 37 CFR 1.56 and 37 CFR 1.97, applicant submits herewith copy of the following prior art document:

U.S. Pat. No. 3,308,213 (Carrigan et al.). The whole document is of interest.

The above prior art is the closest prior art known to applicant.

BACKGROUND AND SUMMARY OF THE INVENTION

The present invention has for its object a method for the vacuum thermoforming and simultaneous piercing of articles of thermoplastic material provided with at least one hole, according to which method a sheet of thermoplastic material is softened by heat and it is caused to adhere against a die and against at least one pointed projection projecting from the die, under the action of vacuum generated between the sheet and the die by means of suction bores provided in the die itself.

The known methods of the above type are based on the fact that, upon piercing of the sheet at the moment of its vacuum thermoforming, there is established, between the sides of the pointed projection and the sheet pierced by same, an airtight seal which is sufficient in order to avoid the loss of vacuum generated between the sheet and the die and therefore to ensure the positive drawing by suction of the softened sheet into the die itself. A vacuum-forming method and die of this type are illustrated, for example, in the U.S. Pat. No. 3,308,213 to Carrigan et al. Practically, however, the above airtight sealing effect has proven to be sufficient only for relatively thin pointed projections presenting a very small diameter, which can be assimilated to needles, and which serve for piercing relatively small holes in the articles of thermoplastic material formed by the forming die, such as for venting holes in closure lids. In the case that it is desired to obtain larger diameter holes, such as ventilation holes provided at the bottom of the pockets of pocket trays used for fruit and vegetable products, the piercing of the sheet of plastic material permits a remarkable loss of the vacuum generated between the softened sheet and the forming die, and consequently it does not permit the softened thermoplastic sheet to be completely drawn by suction and to adhere against the bottom and side walls of the forming die.

The invention has for an object to eliminate the above mentioned inconveniences, and it provides an improved vacuum forming and piercing method and device which can be utilized whenever articles made of thermoplastic material there be pierced, simultaneously with their vacuum forming, large diameter holes, such as holes presenting a diameter from 3 to 12 millimeters, or even more.

For this purpose, in accordance with the invention, a softened sheet of thermoplastic material, prior to being pierced by the pointed projection, is caused to adhere against the die along an annular zone all around the base of the pointed projection itself. In this manner, prior to being pierced by the pointed projection of the softened sheet drawn into the die, there is formed an annular airtight sealing zone between said sheet and said die, around the base of the pointed projection, which annular sealing zone ensures the normal sucking and consequently a perfect adherence of the sheet against the whole surface of the die located outside of said annular sealing zone. As a consequence, while being drawn by suction inside the die, the sheet is pierced by the pointed projection and stretched so as to slide down along the said pointed projection and to perfectly adhere also around the base of the said pointed projection, at the interior of the said annular sealing zone.

The method according to the invention may be carried out by employing any suitable device for the vacuum thermoforming. More particularly, in the case of vacuum thermoforming with simultaneous piercing of pocket trays or cup-shaped containers adapted for containing fruit and vegetable products, in which the pocket of the tray presents at least one ventilation hole obtained in its bottom, the invention contemplates also a device consisting of a forming die presenting at least one cavity and suction bores arranged at the bottom of said cavity, and which is characterized by the feature that from the bottom of said cavity, in the center thereof, there projects outwardly at least one pointed projection presenting a height which is remarkably less than the depth of the cavity, while the suction bores are arranged in the peripheral zone of the bottom of the cavity.

The above and other characteristic features of the invention, and the advantages deriving therefrom will appear evident from the following description of a preferred embodiment, which has been diagrammatically illustrated in the attached drawings.

DESCRIPTION OF THE PREFERRED EMBODIMENT

Figure 1:
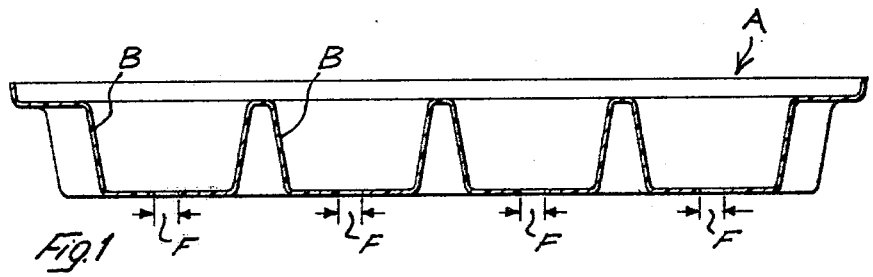
FIG. 1 shows in vertical section a pocket tray, particularly adapted for fruit and vegetable products.

In FIG. 1 there is shown a pocket tray A of known type, made of thermoplastic material and intended to contain particularly (but not exclusively) fruit and vegetable products. The said tray A consists of a plurality of pockets B having the shape of a circular or polygonal cup, said pockets B being connected the one to the other in correspondence of their upper edge and being provided, at the center of their bottom, with a ventilation hole F.

For the so-called vacuum or suction forming of this type of pocket trays there can be used any suitable forming apparatus known in the art, such as, for example, the one disclosed in the U.S. Pat. No. 3,026,566 (Martelli et al.). The said apparatus will employ a particular forming die constructed in accordance with the invention, which has been partially illustrated in FIGS. 2 to 5, and which presents, for each pocket B of the tray, a cavity 1 having a shape which is identical to the shape of the pocket B. In the peripheral zone of the bottom 101 of cavity 1, and more particularly in correspondence of the angle formed by the said bottom 101 and the side walls of cavity 1, there are provided suction bores 4 which may be selectively connected, in a known manner, either with a suction pump (not shown) or with the atmosphere.

From the center of bottom 101 of cavity 1 of the forming die 2 there projects upwardly a rigid pointed projection 3, which is perpendicular to bottom 101. The said pointed projection may present a substantially conical shape, as illustrated, or it may consist of a substantially cylindrical stem having a pointed tip. Also, there can be utilized projections 3 having blunt tip, for example projections having the shape of a frustum of a cone or even of a cylinder, with flat or spherical tip, convex or concave.

The height of pointed projection 3 above the bottom 101 is much less than the depth of cavity 1 of the forming die 2, while the maximum diameter of the pointed projection 3, measured at the base of same, is smaller than the diameter of the hole F which is to be obtained at the bottom of the pocket B of the tray A.

According to a preferred embodiment, for the piercing of trays presenting pockets B with a depth from 25 to 70 millimeters, there are employed pointed projections 3 having a height comprised between 10 and 20 millimeters. By using pointed projections presenting a maximum base diameter from 2 to 3 millimeters, there are obtained holes F presenting a diameter which is comprised between 6 and 12 millimeters. The pointed projection 3 may be made of any suitable material and secured by any means to the bottom 101 of cavity 1, or it can be obtained integrally of one piece together with the forming die 2, as in the illustrated embodiment.

Figure 2:
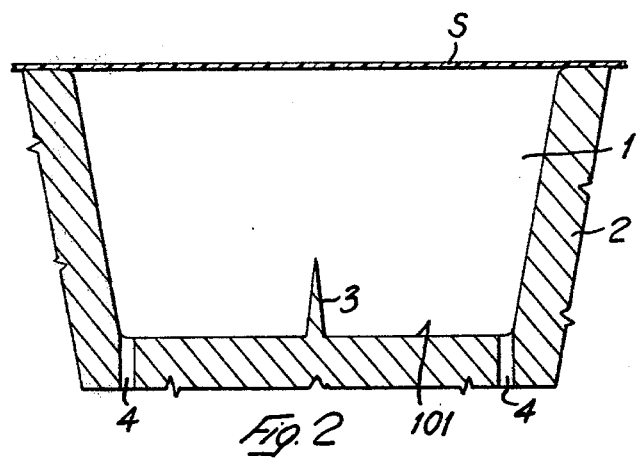
FIGS. 2 to 5 show in vertical section and in an enlarged scale a detail of the die for the vacuum thermoforming of the pocket tray of FIG. 1, during as many operative phases of the method according to the invention.
Figure 3:
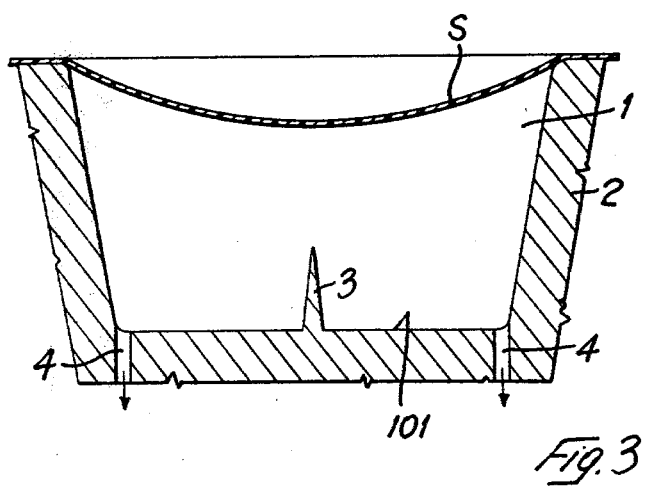
Figure 4:
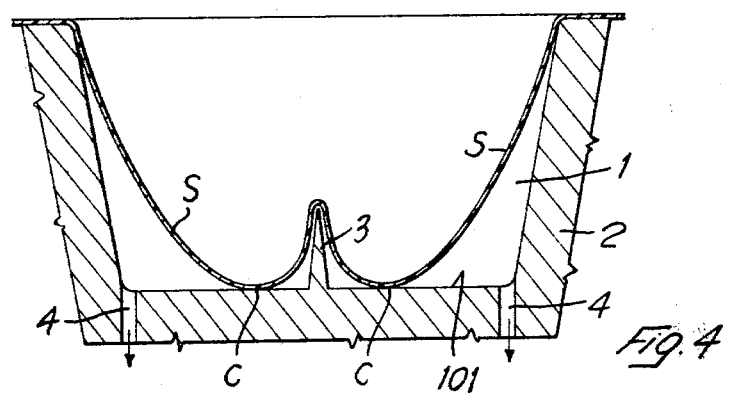
Figure 5:
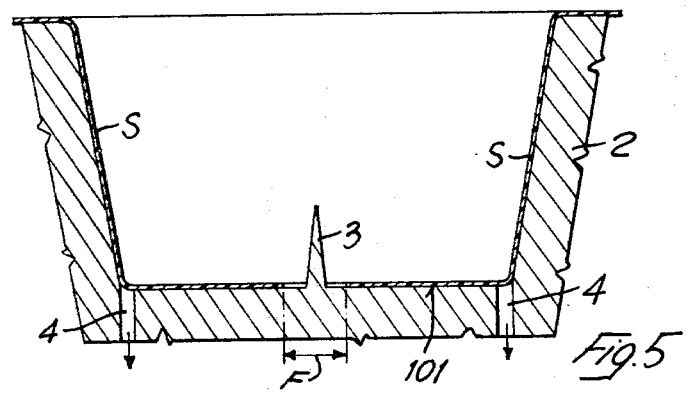

In order to obtain the thermoforming together with the simultaneous piercing of the pocket tray A, a sheet S of thermoplastic material is placed on the forming die 2 and heated until it becomes soft. Prior to heating the thermoplastic sheet, the sheet is clamped by any known means (not shown) in airtight manner against the upper edge of the forming die 2, so as to close the cavities 1 of the said die 2, as indicated in FIG. 2. Subsequently, air is removed from the cavities 1 through the suction bores 4, as indicated by the arrows in FIGS. 3 to 5, so that the heated and softened sheet S is drawn into the interior of said cavities 1. Firstly, the sheet S flexes inwardly and penetrates into each cavity 1 of the forming die 2, giving origin to a substantially spherical bag, as illustrated in FIG. 3. The said bag becomes progressively deeper, until its central portion touches the tip of the pointed projection 3 projecting from the bottom 101 of cavity 1. In this manner, the central portion of the sheet S which has penetrated into the interior of cavity 1 comes to lie on the pointed projection 3 and it encloses the projection like a cap, while all around said pointed projection 3 the sheet S is further sucked and drawn into cavity 1, until it comes into contact with the bottom 101 of cavity 1 along an annular zone C around the base of pointed projection 3, as shown in FIG. 4. Subsequently, by continuing to apply suction on the sheet S from the outside with respect to said annular contact zone C, the sheet is drawn against the pointed projection 3 and thus it is pierced, and thereafter it slides along the said pointed projection 3, until it comes to adhere against the bottom 101 of the cavity 1 of forming die 2. Finally the sheet S is caused to adhere, always under the action of suction exerted through bores 4, against the side walls of the cavity 1, until it adheres completely also against the bottom 101, thus assuming the shape of the cavity of the forming die. The stretching of the sheet S during the last phase of its inward movement at the interior of die 1 causes a widening of the bore F pierced by the pointed projection 3, so that the said bore assumes its final diameter, which is greater than the maximum diameter of the said pointed projection 3 in correspondence of its base, as it clearly appears from FIG. 5.

It is understood that the above description refers to a preferred embodiment, and that many variations and modifications are possible, while remaining within the limits of the invention.

We claim:

1. A method for vacuum thermoforming and simultaneous piercing at least one hole in an article formed of thermoplastic material which comprises:

placing a sheet of thermoplastic material over at least one cup-shaped die, each having a pointed projection at the center of and perpendicular with its bottom with the length of said projection much less than the depth of said cup-shaped die; securing the thermoplastic material along the periphery of each cup-shaped die enclosing an area within each cup-shaped die; evacuating the enclosed area of said cup-shaped die between said sheet of thermoplastic material and the bottom of said cup-shaped die; heat-softening said thermoplastic material until said sheet is drawn into said evacuated area of said cup-shaped die and touches the tip of said pointed projection; further evacuating said area and heating said thermoplastic sheet until said sheet touches the bottom of said die encompassing said pointed projection along an annular zone on the bottom of said die; then forming a hole in said sheet by continually evacuating said area until said pointed projection pierces said sheet and said pierced portion of said sheet slides down to the bottom of said die; continually evacuating said area until the portion of said sheet outwardly of said annular zone is drawn downwardly against the bottom and sides of said die thereby conforming to the shape of the die; said hole being widened to a diameter greater than the maximum diameter of said pointed projection; and permitting said heat softened sheet to cool.

* * * * *